March 31, 1964     M. P. MATTHEW     3,126,870
SELECTIVE BIRD FEEDER
Filed Oct. 23, 1961

*INVENTOR.*
MORTON P. MATTHEW
BY *Robert B Harmon*
*ATTORNEY*

[Column 1]

3,126,870
SELECTIVE BIRD FEEDER
Morton P. Matthew, R.F.D. 2, Kreiner Lane,
Norwalk, Conn.
Filed Oct. 23, 1961, Ser. No. 146,890
9 Claims. (Cl. 119—51)

This invention relates to bird feeding devices generally and more particularly to an improved selective bird feeder capable of operating effectively to prohibit large birds and undesirable animals from gaining access to the food material contained therein.

Bird feeding devices which are situated near trees or in other similar open locations for the purpose of providing food material for small birds are often subjected to visitations from large birds, squirrels, and similar undesirable animals. These large animals not only consume the food material within the feeder, often damaging the feeder in the process, but also prevent small birds from using the feeder facilities. Thus, the intended purpose of a bird feeder is often defeated, since large birds and undesirable animals are attracted, the presence of which serves to effectively alienate the desired small bird life.

The provision of a bird feeding device capable of effectively repelling large birds and undesirable animal life is an essential to any successful small bird feeding program, and many attempts have been made to provide bird feeders with devices for preventing undesirable animal life from gaining access to the feed material. In most instances, the prevention devices of the prior art have failed to impede a marauding animal, as these devices are often disabled when subjected to the prolonged attack of a marauder.

It is a primary object of this invention to provide an improved selective bird feeder which operates to effectively prevent animals and large birds from gaining access to the food material contained therein.

Another object of this invention is to provide an improved selective bird feeder which may be adjusted to grant access to the food material contained within the feeder to birds of predetermined sizes while denying access to the food material to larger birds and animals.

A further object of this invention is to provide an improved selective bird feeder which includes protective features which operate to prevent marauding animals and large birds from gaining access to the food material within the feeder and which incorporates constructional features to prevent marauding animals and birds from subjecting the protective devices to prolonged attacks.

Another object of this invention is to provide an improved selective bird feeder capable of receiving a large volume of food material and automatically supplying the food material, when needed, to bird feeding stations.

A further object of this invention is to provide an improved selective bird feeder which includes a food collecting section wherein food spilled from the feeding stations is collected for re-use.

A still further object of this invention is to provide an improved selective bird feeder of simple construction which may be economically produced and maintained.

With the foregoing and other objects in view, the invention resides in the apparatus described by the following specification and appended claims, certain details of construction of which are illustrated in the accompanying drawings in which:

Figure 1:
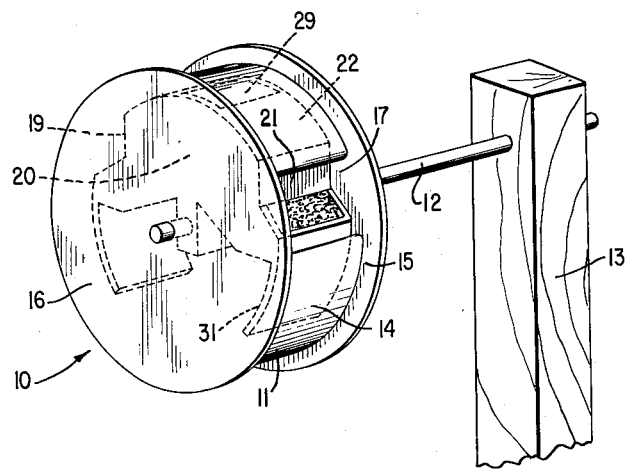
FIGURE 1 is a perspective view of the bird feeder of the present invention.
Figure 3:
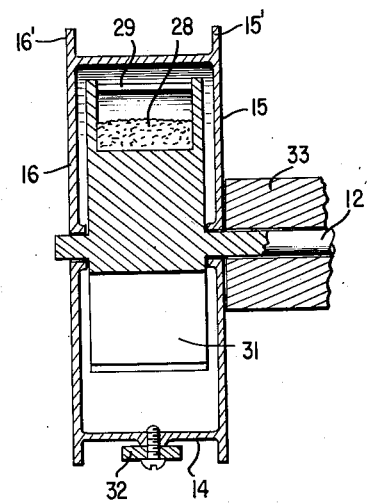
FIGURE 3 is a sectional view of the bird feeder of the present invention taken along lines 3—3 of FIGURE 2.

Referring now to the drawings, the selective bird feeder of the present invention, indicated generally at 10, includes an enclosure or drum 11 which is mounted for free rotation upon a horizontal supporting shaft 12. Shaft 12 may be secured to a post 13, as shown by FIGURE 1, or to any suitable supporting means. A second freely rotating drum 33, of smaller diameter than the enclosure 11, may be positioned on the shaft 12 between the enclosure 11 and the post or supporting means 13 (FIGURE 3).

Enclosure 11 may be cylindrical in configuration, as illustrated by FIGURE 1, and includes side walls 14 and end walls 15 and 16. End walls 15 and 16 have a greater diameter than the side walls 14 and extend laterally beyond the side walls 14 to form flanges 15' and 16', as illustrated by FIGURE 3. Side walls 14 are provided with access openings 17 and 18 which permit access to the interior of the enclosure 11.

Rigidly affixed to the supporting shaft 12 within the enclosure 11 is a feed material dispenser 19 which is mounted in spaced relationship to the rotatable enclosure 11. Feed dispenser 19 includes side walls 20, end walls 21, a top wall 22 and a bottom wall 23. Bottom wall 21 extends beyond the extremities of the end walls 21 and is provided at either end with an upturned flange 24 which acts to form feed cups 25 and 26. Bottom wall 23 slants upwardly from the feed cups 25 and 26 and cooperates with the end walls 21 and the top wall 22 to form a central storage section 27 for feed material 28. Top wall 22 is provided with an access opening 29 through which feed material is introduced into the central storage section 27. Access opening 29 may be provided with a suitable cap or closure member to retain the feed material within the storage section 27. The end walls 21 of the feed material dispenser 19 are spaced above the bottom wall 23 to provide access openings 30 to the feed cups 25 and 26 so that the food material 28 may move from the central storage section 27 down the sloping bottom wall 23 to the feed cups 25 and 26.

Figure 2:
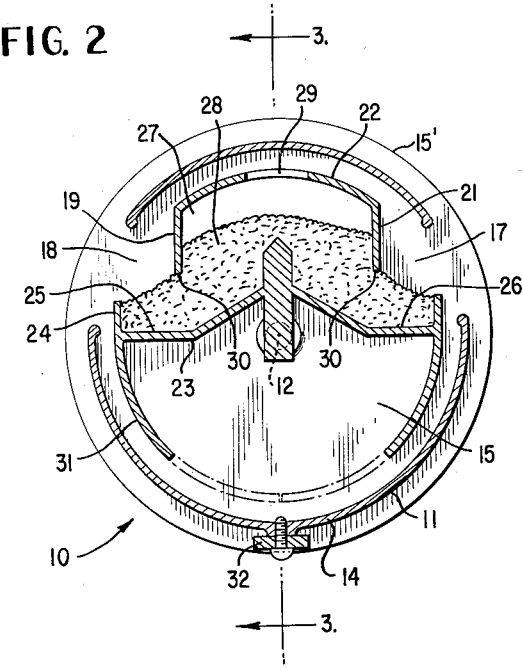
FIGURE 2 is a longitudinal sectional view of the bird feeder of the present invention.

A pair of skirts 31 may be secured to the lower portions of the feed cups 25 and 26 below the flanges 24. Skirts 31 extend downwardly from the feed cups 25 and 26 in spaced relationship to the outer enclosure 11. The skirts 31 may extend only partially along the lower section of the outer enclosure 11, or they may be extended, as indicated by the broken lines in FIGURE 2, to meet at the bottom portion of the outer enclosure 11.

With the bird feeder 10 operatively mounted on a suitable support, the outer enclosure 11 is rotatable about the enclosed feed material dispenser 19. A weight 32 is attached to the bottom portion of the rotatable outer enclosure 11 so that the openings 17 and 18 in the outer enclosure will be aligned with the feed cups 25 and 26 to provide access to the feed cups. Weight 32 also acts as a selective control device, for the magnitude of this weight will determine whether or not the outer enclosure 11 will rotate when the weight of a bird or other animal is placed upon the edges of the openings 17 and 18.

In the operation of the bird feeder 10 of the present invention, the outer enclosure 11 may be rotated so that one of the openings 17 and 18 aligns with the access opening 29 in the feed material dispenser 19. With the outer enclosure so aligned, feed material may be introduced into the storage chamber 27 of the feed dispenser 19. This feed material then slides down the slanted bottom wall 23 of the feed dispenser into the feed cups 25 and 26, thereby automatically maintaining the feed cups in a filled condition. When a small bird lights upon the edges of the openings 17 and 18, the weight 32 prevents the rotation of the outer enclosure 11, and access to the feed cups 24 and 25 is provided. However, when a heavy bird or a marauding animal places weight upon the edges of the openings 17 and 18, the outer enclosure 11 is caused to rotate so that access to the interior of the enclosure is prevented by the skirts 31. Also, this rotation of the outer enclosure tends to dislodge the marauder from the feeder 10. This dislodging action is also aided by the rotating drum 33, which rotates to prevent squirrels or other marauding animals from perching upon the supporting shaft 12 while feeding from the feed cups 25 and 26. The flanges provided by the end walls 15 and 16 of the rotating outer enclosure 11 also tend to prevent access to the feed cups 25 and 26 by an animal perched upon the horizontal supporting shaft 12.

The lower portion of the rotating outer enclosure 11 acts as a spilled food collecting receptacle for food material falling from the feed cups 25 and 26. This material will flow between the walls 14 of the outer receptacle 11 and the skirts 31 to collect in the bottom of the outer receptacle, and may be removed by rotating the outer receptacle until the material falls from either the opening 17 or 18.

It will be readily apparent to those skilled in the art that the present invention provides a novel and improved selective bird feeder which operates to effectively repell undesirable large birds and marauding animals. The arrangement and types of components utilized within this invention may be subject to numerous modifications well within the purview of this inventor who intends only to be limited to a liberal interpretation of the specification and appended claims.

I claim:

1. A selective bird feeder comprising a support means, a feed material dispenser affixed to said support means, and an outer enclosure rotatably mounted to encase said feed material dispenser, said outer enclosure including access openings normally aligned to permit access to said feed material dispenser, said access openings being effectively closed by the rotation of said outer enclosure relative to said feed material dispenser.

2. A selective bird feeder comprising a support means, a feed material dispenser including feed containing means affixed to said support means, and an outer enclosure rotatably mounted to encase said feed material dispenser, said outer enclosure including access openings normally aligned with said feed containing means, said access openings being moved from alignment with said feed containing means upon rotation of said outer enclosure relative to said feed material dispenser to deny access to large birds and marauding animals.

3. A selective bird feeder comprising a support means, a feed material dispenser affixed to said support means, said feed material dispenser including a central storage compartment and a plurality of feed cups extending outwardly from said central storage compartment in cooperation therewith, and an outer enclosure rotatably mounted to encase said feed material dispenser, said outer enclosure including access openings aligned with said feed cups, said access openings being effectively closed upon rotation of said outer enclosure relative to said feed material dispenser.

4. A selective bird feeder comprising a support means, a feed material dispenser affixed to said support means, an outer enclosure rotatably mounted to encase said feed material dispenser, and weight means attached to said outer enclosure, said weight means acting to prohibit the rotation of said outer enclosure by small, lightweight birds, but acting to permit the weight of large birds and marauding animals to rotate said outer enclosure relative to said feed material dispenser, thereby dislodging said large birds and animals from said feeder.

5. A selective bird feeder comprising a support means, a feed material dispenser affixed to said support means, said feed material dispenser including a central storage compartment and a plurality of feed cups extending outwardly from said central storage compartment in cooperation therewith, said central storage compartment including a top wall having an access opening therein, side walls and end walls interconnected with said top wall, and bottom walls connected to said side walls, said bottom walls being inclined upwardly from said feed cups whereby material in said central storage compartment is automatically deposited into said feed cups, and an outer enclosure rotatably mounted upon said supporting means to encase said feed material dispenser, said outer enclosure including access openings aligned with said feed cups, said access openings being disaligned with said feed cups upon rotation of said outer enclosure relative to said feed material dispenser to deny access to said feeder.

6. A selective bird feeder comprising a support means, a feed material dispenser including a plurality of feed cups affixed to said support means, closure means depending from said feed material dispenser, and an outer enclosure rotatably mounted to encase said feed material dispenser and closure means, said outer enclosure including access openings normally aligned with said feed cups to permit access to said feed material dispenser, said access openings being disaligned with said feed cups and aligned with said closure means upon rotation of said outer enclosure relative to said feed material dispenser, whereby access to said feed material dispenser is effectively prohibited.

7. A selective bird feeder comprising a support means, a cylindrical outer enclosure rotatably mounted upon said support means, said outer enclosure including a cylindrical side wall having a plurality of access openings provided therein and two circular end walls secured to said side wall, said end walls being of larger diameter than said side wall to form flanges extending outwardly of said side wall, a feed material dispenser affixed to said support means and encased within said outer enclosure in spaced relationship thereto, said dispenser including a plurality of feed cups normally aligned with said access openings in said outer enclosure, and weight means affixed to said outer enclosure to prevent rotation thereof relative to said feed material dispenser when a small bird alights upon said feeder, but to permit the rotation of said outer enclosure under the influence of the weight of a large bird or animal whereby said access openings are disaligned with said feed cups to prevent access to said feed cups.

8. A selective bird feeder comprising a horizontal support means, a cylindrical outer enclosure rotatably mounted upon said support means, said outer enclosure including a cylindrical side wall having a plurality of access openings provided therein and two circular end walls secured to said side wall, said end walls being of larger diameter than said side wall to form flanges extending outwardly of said side wall, a feed material dispenser affixed to said support means and encased within said outer enclosure in spaced relationship thereto, said feed material dispenser including a central storage compartment and a plurality of feed cups extending outwardly from said storage compartment in cooperation therewith, said central storage compartment including a top wall having an access opening provided therein, end walls and side walls interconnected with said top wall, and bottom walls connected to said side walls, said bottom walls being inclined upwardly from said feed cups whereby food material in said storage compartment may be automatically deposited in said feed cups, closure means extending downwardly from said feed cups in spaced relationship with the side wall of said outer enclosure, and weight means attached to said outer enclosure to maintain said access openings in normal alignment with said feed cups, said weight means prohibiting rotation of said outer enclosure relative to said feed material dispenser when a small bird alights upon said feeder but permitting rotation of said outer enclosure under the influence of the large birds and marauding animals, whereby said access openings are disaligned with said feed cups and aligned with said closure means to prevent access to said feed material dispenser.

9. The selective bird feeder of claim 8 wherein a freely rotating drum is mounted upon said horizontal supporting means adjacent said outer enclosure.

No references cited.